United States Patent
Guse (10) Patent No.: US 7,209,485 B2
(45) Date of Patent: Apr. 24, 2007

(54) METHOD AND ARRANGEMENT FOR CONTROLLING DATA PACKETS

(75) Inventor: Merten Guse, Potsdam (DE)

(73) Assignee: Siemens Aktiengesellschaft, Munich (DE)

(*) Notice: Subject to any disclaimer, the term of this patent is extended or adjusted under 35 U.S.C. 154(b) by 1065 days.

(21) Appl. No.: 10/218,175

(22) Filed: Aug. 14, 2002

(65) Prior Publication Data

US 2003/0035431 A1 Feb. 20, 2003

(30) Foreign Application Priority Data

Aug. 14, 2001 (DE) .............................. 101 39 936

(51) Int. Cl.
*H04L 12/56* (2006.01)
(52) U.S. Cl. ...................................... 370/401; 370/230
(58) Field of Classification Search ........ 370/351–358, 370/319, 200, 395.1, 392, 389, 401, 402, 370/386, 230, 428, 464, 471, 474
See application file for complete search history.

(56) References Cited

U.S. PATENT DOCUMENTS 6,157,644 A * 12/2000 Bernstein et al. ........... 370/392

FOREIGN PATENT DOCUMENTS

| WO | WO01/05114 A2 | 1/2001 |
| WO | WO01/43334 A2 | 6/2001 |
| WO | WO01/43334 A3 | 6/2001 |
| WO | WO02/23862 A1 | 3/2002 |

* cited by examiner

*Primary Examiner*—Brenda Pham
(74) *Attorney, Agent, or Firm*—Staas & Halsey LLP (57) ABSTRACT

A method and an arrangement for controlling data packets in a computer network forwards particular data packets, from the whole of a data stream, via a gateway with a host processor. The particular data packets are forwarded to subsystems for further processing, and data packets are introduced into the data stream by the subsystems via the gateway. In this context, a data packet router forwards the data packets directly, i.e. past the host processor, to the subsystems, and the data packet router introduces the data packets coming from the subsystems directly into the data stream using an interface device.

12 Claims, 7 Drawing Sheets

METHOD AND ARRANGEMENT FOR CONTROLLING DATA PACKETS

CROSS REFERENCE TO RELATED APPLICATIONS

This application is based on and hereby claims priority to German Application No. 101 39 936.7 filed on Aug. 14, 2001, the contents of which are hereby incorporated by reference.

BACKGROUND OF THE INVENTION

The invention relates to a method for controlling data packets in gateways, particularly RTP (Real Time Transport Protocol) data packets, and to an arrangement for this.

A computer network, for example an Ethernet, is already frequently used today for transmitting voice and video data. Particularly in the case of a video conference, rapid transmission of the data is important so that the participants do not notice any jumps in time and/or delays, but instead experience continuous transmission. The data packets for voice and video transmission are generally characterized by an RT protocol.

The RTP data packets transported via the Ethernet are routed in a gateway to a host processor arranged at that point. The host processor filters the RTP data packets out of the Ethernet's data stream and supplies the filtered packets to subsystems, for example digital system processors (DSP), for further processing. The subsystems can process the received data further, for example can recode them into a PCM (Pulse Code Modulation) representation, and can then forward them in a conventional manner.

In the opposite direction, the DSPs recode voice and video signals into RTP data packets and transmit them to a host processor. The host processor in turn forwards the data packets to the interface device for the Ethernet in order to insert the data packets into the Ethernet data stream.

The host processor is involved in receiving and transmitting RTP data. Particularly when there is a large volume of RTP data, this results in a high utilization level for the host processor, whose performance capacity is now not available to other processes.

It is therefore one potential object of the present invention to specify a method and an arrangement for controlling data packets in a gateway which significantly relieve the load on the host processor, this in turn resulting in a marked increase in performance for other tasks.

SUMMARY OF THE INVENTION

A fundamental concept is that the method involves the RTP data packets being routed in the gateway, in the reception direction, past the host processor to the subsystems performing further processing. In the transmission direction, the RTP data packets are forwarded from the subsystems past the host processor to the interface device in order to feed them into the network-internal (Ethernet) data stream. For this purpose, a data packet router is arranged downstream of the interface device and forwards RTP data to the subsystems, and forwards other data packets to the host processor. In the opposite direction or transmission direction, the data packet router receives data packets both from the subsystems and from the host processor and forwards them to the interface device, preferably forwarding RTP data packets to the interface device for the purpose of feeding them into the (Ethernet) data stream.

One advantageous embodiment filters RTP data packets, in the reception direction, out of the network's data stream and forwards these filtered data packets directly to a bank of DSPs for further processing.

Preferably, the filtering involves comparing the addresses of all the data packets with addresses stored in an address memory. The data packet router forwards the data packets with addresses, which are stored, to the subsystems or DSPs. Data packets whose addresses do not belong to the stored addresses can reach the host processor unimpeded.

In one advantageous embodiment, in the transmission direction, the data packets coded by the DSPs are transformed into RTP data packets. These are then introduced into the network's data stream. In this context, the RTP data packets can preferably be introduced into the network so that performance of the real-time applications can be more convenient for the user.

Preferably, the arrangement is implemented in a network which is a local area network based on the Ethernet protocol.

In another advantageous embodiment, the arrangement has a bank of DSPs to which the data packet router forwards RTP data packets directly for further processing.

In one particularly advantageous embodiment, the arrangement has at least one further data packet router, so that the various data packet routers can forward different types of data packets to appropriate subsystems.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
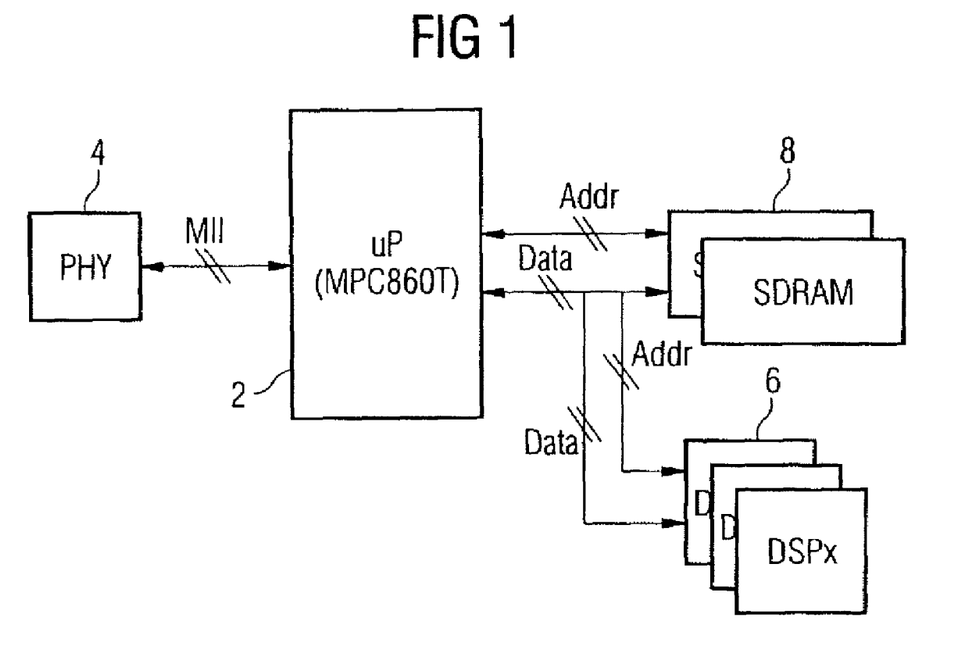
FIG. 1 shows, schematically, a conventional interface processor arrangement for a gateway.

FIG. 1 shows a conventional interface processor arrangement for a gateway having a microprocessor (host processor) 2 which is connected to an interface device (physical interface device) 4 via a media independent interface (MII). In addition, the host processor 2 is connected to a bank of subsystems 6. The subsystems 6 can, by way of example, be digital signal processors (DSP) processing RTP data packets further. The host processor 2 is additionally connected to a memory (SDRAM) 8 which can temporarily store incoming data packets.

The figure clearly shows that all the data packets from the Ethernet data stream or from the interface device 4, including those intended for the subsystems 6, are routed via the host processor 2.

Figure 2:
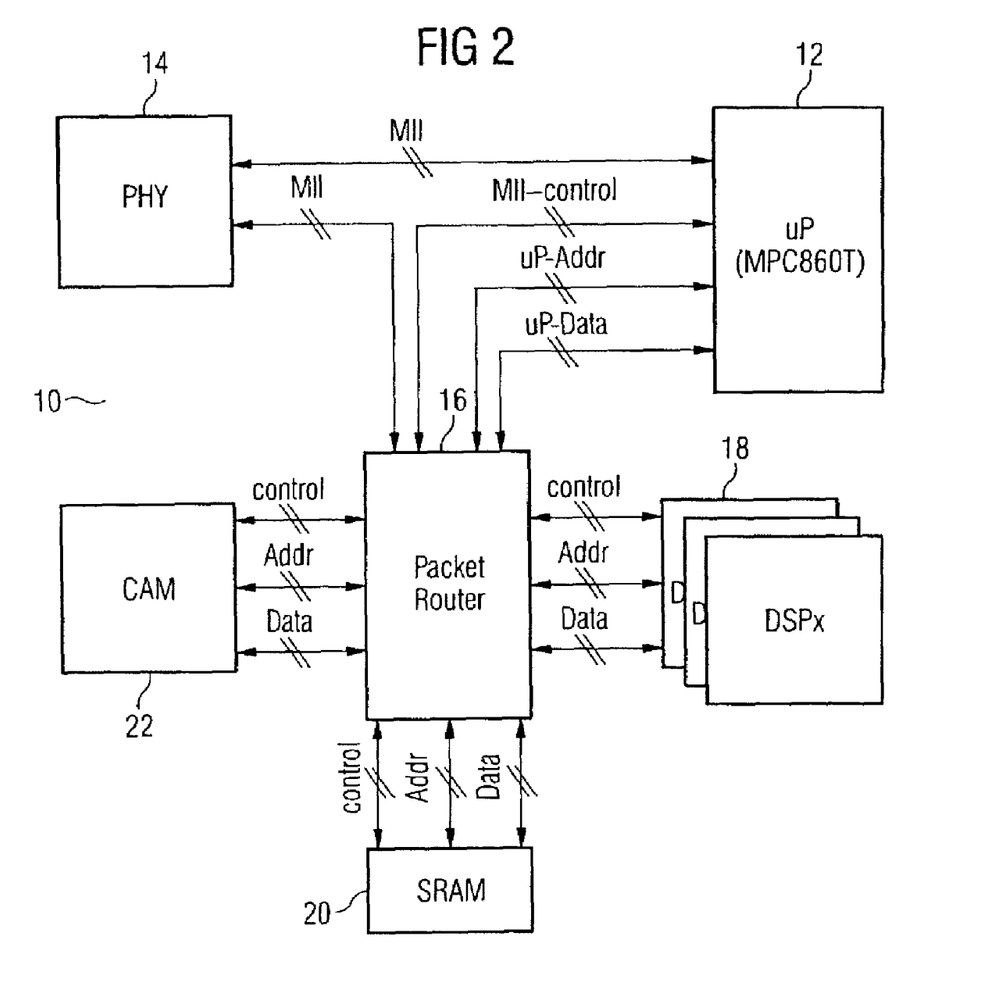
FIG. 2 shows, schematically, a gateway according to one aspect of the invention.

FIG. 2 shows an arrangement 10 for a gateway having a host processor 12, an interface device 14 and a data packet router (Packet Router) 16. The interface device 14 is connected both to the host processor 12 and to the data packet router 16 by an MII. The data packet router 16 is connected to the host processor 12, to subsystems (DSP) 18, to a temporary store (SRAM) 20 and to an address memory (CAM) 22.

The data packet router 16 receives from the interface device 14 all the data packets intended for this arrangement 10. It compares the addresses of the data packets with a list of addresses which are stored in the address memory 22. Data packets having such an address are forwarded directly to the appropriate subsystem 18 by the data packet router 16. Data packets whose address does not match an address from the address memory 22 are forwarded to the microprocessor 12 by the data packet router 16.

The address memory 22 is a "CAM" (Content Address Memory) and is required for storing the connection data. It is possible to use a commercially available CAM. If the number of active RTP connections is 256 or more, a rapid decision needs to be made as to the destination to which the packets need to be routed. The CAM functionality can be implemented within the data packet router 16 using dedicated RAM cells (Read and Modify Memory). The address memory 22 needs to be managed by the host processor 12 and is then available for distributing or routing the RTP packets. It is not necessary for the host processor 12 to be equipped with an address memory 22 which is suitable for an Ethernet.

An external memory 20 is used as a buffer for the data packets in both directions. Depending on the volume of data and on cost, an SRAM or DRAM interface is used. An SRAM has the higher speed of access but is much more expensive than a DRAM from a particular size onward. The speed drawbacks of the DRAM can be minimized by using a cache and/or a pipeline. The complexity for a speed-optimized DRAM implementation is much higher than for an SRAM variant. If the memory 20 is produced using an SRAM, then the memory available is fast enough even for interchange between internal modules. An estimate yields a requirement of approximately 2 to 4 Mbytes with 256 channels for the specific case of RTP voice packets. The data bus width should be matched to the host processor 12 and to the data structures. The number of address lines is geared to the address space which needs to be made available.

The registers within the temporary store 20, which are required for controlling the modules, need to be capable of being read and written to directly. The data area is located in the external memory 20. For every channel, there are memory areas which can be accessed by the host processor 12. It would be possible for a channel number to need to be input first and for the data packet router 16 then to provide the data for the host processor 12 or to transmit them to the respective memory structure.

The host processor 12 needs to be able to make adjustments in every DSP 18. It is not necessary for it to access the DSP 18 directly, however. In this case, the temporary store 20 can also be used. The structure can be forwarded to the DSPs 18 by the data packet router 16. The RTP packets for an active connection are no longer transmitted via the host processor 12 when the data packet router 16 is used.

Figure 3:
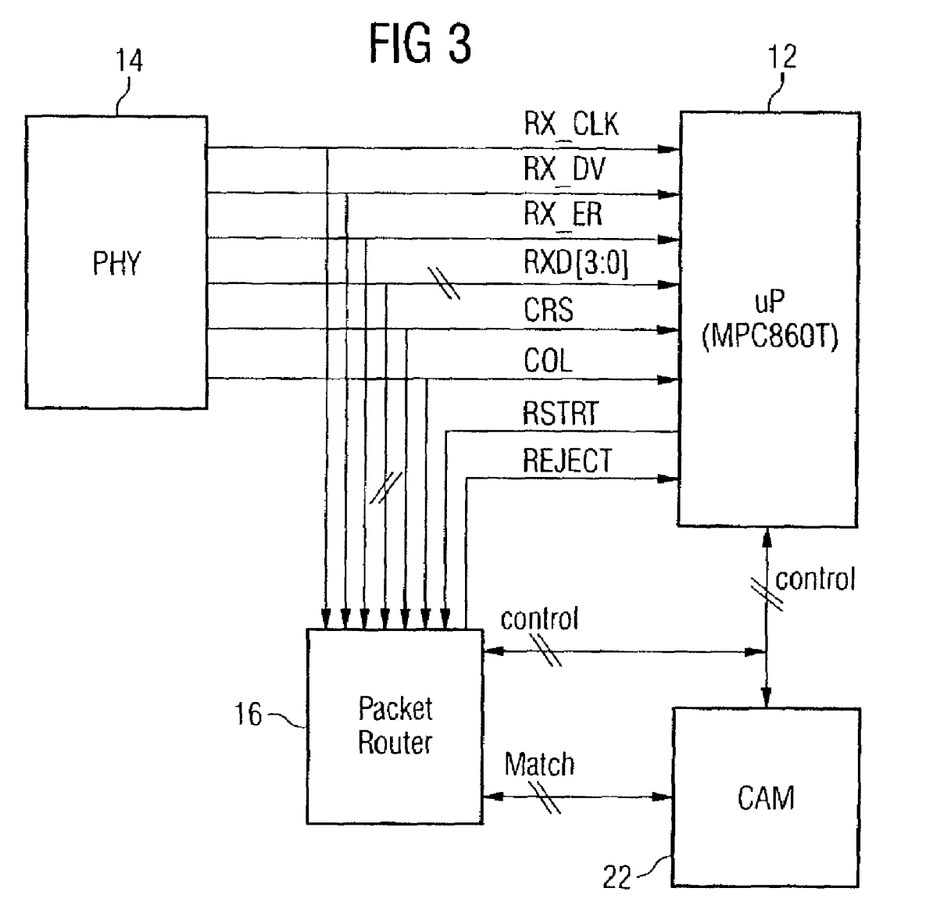
FIG. 3 shows a sketch of the signal line in the reception direction.

FIG. 3 shows, in sketch form, signal lines in an arrangement in the reception direction. As can already be seen from FIG. 2, both the microprocessor 12 and the data packet router 16 are connected to the interface device 14, in each case via an MII. Both MII interfaces can operate on the same interface device 14. The microprocessor 12 or the data packet router 16 signals the start of a valid Ethernet packet, for example using an RSTRT signal.

The data packet router 16 "listens in" on the Ethernet interface 14 and, following evaluation of all the information, generates the reject signal for the microprocessor 12 or its specific MAC (Media Access Control). If the reject signal is generated before the end of the Ethernet packet, the buffer descriptors used are used for new packets. The data in the buffer are discarded. In the case of an implementation using a Motorola PowerPC, the processor core is not burdened with complex address comparisons. As soon as the data are received, a decision is made as to whether or not the Ethernet packet needs to be processed now. The RSTRT signal marks the start of the Ethernet packet's reception address. In this way, the control logic is always freshly synchronized to the incoming packets.

Figure 4:
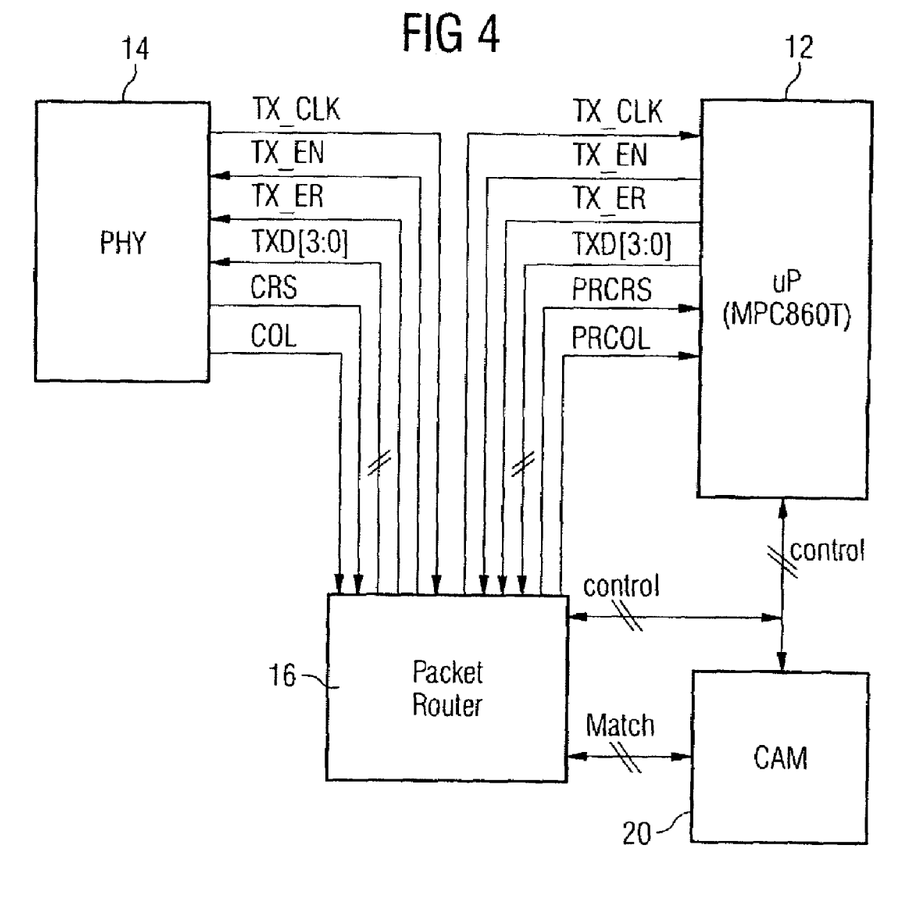
FIG. 4 shows a sketch of the signal line in the transmission direction.

FIG. 4 likewise shows the arrangement shown in FIG. 3, but with the signal lines in the transmission direction. In the transmission direction, that is to say from the microprocessor 12 to the interface device 14, control of the collision signals provides for synchronization of the two MACs, those of the host processor 12 and of the data packet router 16, on an interface device 14. This control is undertaken by the data packet router 16. A TX_EN signal is generated by the microprocessor 12. This signal marks a valid data nibble on the MI interface in the transmission direction. If the data packet router 16 is currently sending a data packet, a CRS (Carrier Receive Sense) signal and a COL (Collision) signal are used in the microprocessor 12 to signal that the transmission medium is currently being used. The MAC of the microprocessor 12 thus enters the collision cycle and repeats its last transmission.

If there is a collision out of the transmission path (interface device 14 signals collision), this is forwarded transparently to the microprocessor 12.

Figure 5:
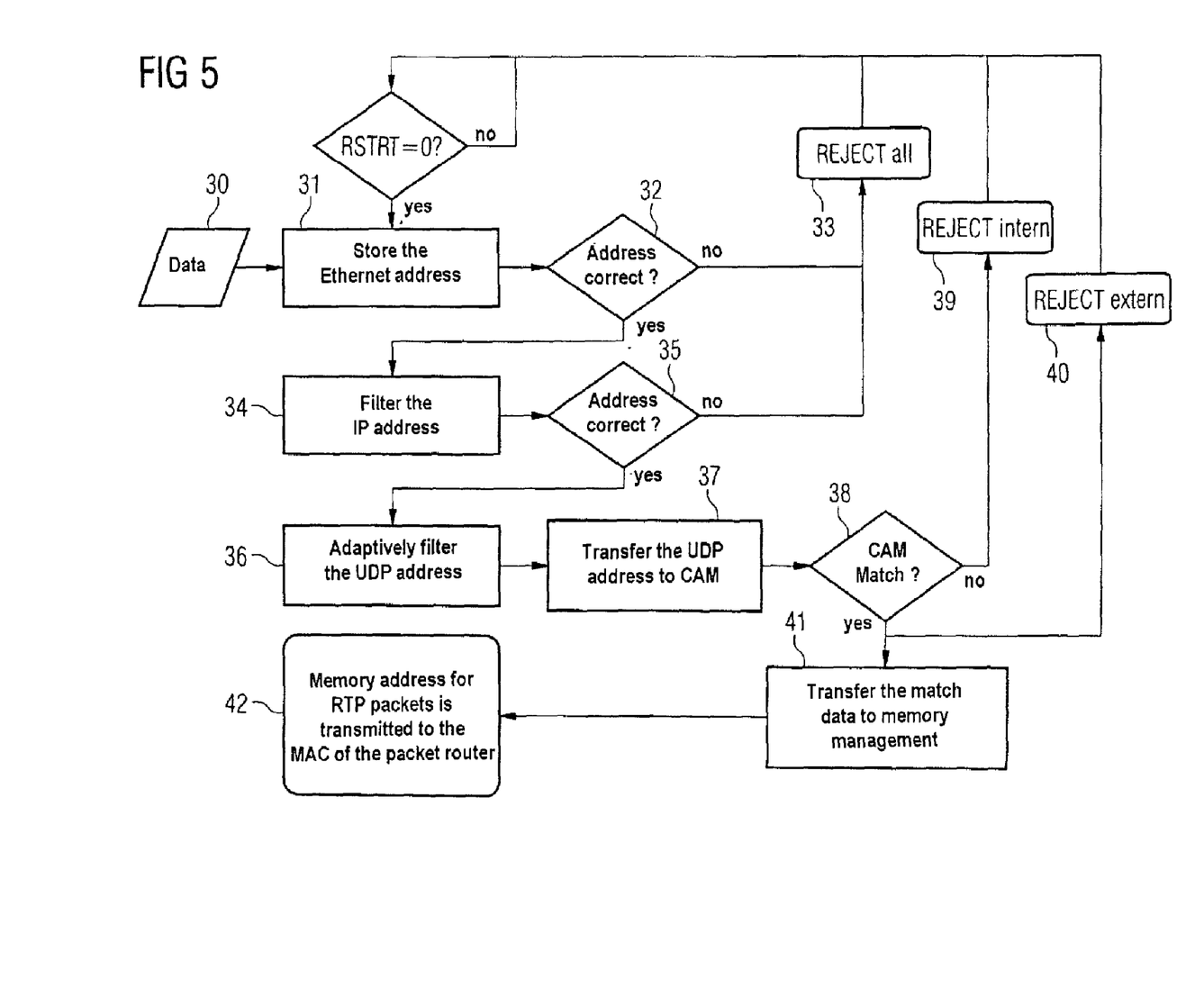
FIG. 5 shows a flowchart for address determination using the address memory.

FIG. 5 shows a flowchart for address determination using the address memory 22 from FIG. 2. The address memory 22 allows the incoming addresses to be compared with its entries. Within a very short time, it is possible to signal whether or not the address is held in the address memory 22. This comparison is independent of the software on the host processor 12 (from FIG. 2). The address memory 12 can, by way of example, be an MCM69C232 from Motorola. This can manage 4096 entries with a depth of 64 bits each. The mean access time is 160 ns at a clock rate of 50 MHz. The search for a valid address needs to be made in three steps. First, a valid Ethernet address needs to be sought in the incoming Ethernet frame 30. In box 31, the Ethernet address is stored. In box 32 a check is carried out to determine whether the address is valid. If the address is not correct, there is immediately a reject 33 for both MACs. Next, in box 34, the IP address is filtered out in the frame in order to check its validity in box 35. If it is not valid, the reject 33 occurs for both MACs.

Since the IP header can be of variable length, the position of the UDP destination port is not fixed. This means that the data packet router 16 needs to readjust itself to the position of the UDP destination port for the frame. Since there are a large number of active UDP connections, the address memory 22 is used to find a valid UDP destination port.

Hence, in box 36, the UDP address is filtered out and is transferred to the address memory 22 in box 37. In box 38, the address memory 22 checks the UDP address, i.e. it compares the transferred UDP address with those addresses stored in the address memory. If the address memory 22 did not find a valid UDP address, a reject signal is produced internally in box 39. If the temporary address store 22 found a valid UDP destination port, a reject signal is produced for the MAC of the microprocessor 12 in box 40.

Since the size of the UDP destination port is only 32 bits and the temporary address store 22 has a depth of 64 bits, the remaining 32 bits can be used for storing additional data, for example connection data, port, DSP, etc. The match data are transferred in box 41 to memory management, and the address memory 22 allows these match data to be output. In box 42, the memory address for RTP packets is transmitted to the data packet router's MAC. The data packet router can now use the data for further processing.

Figure 6:
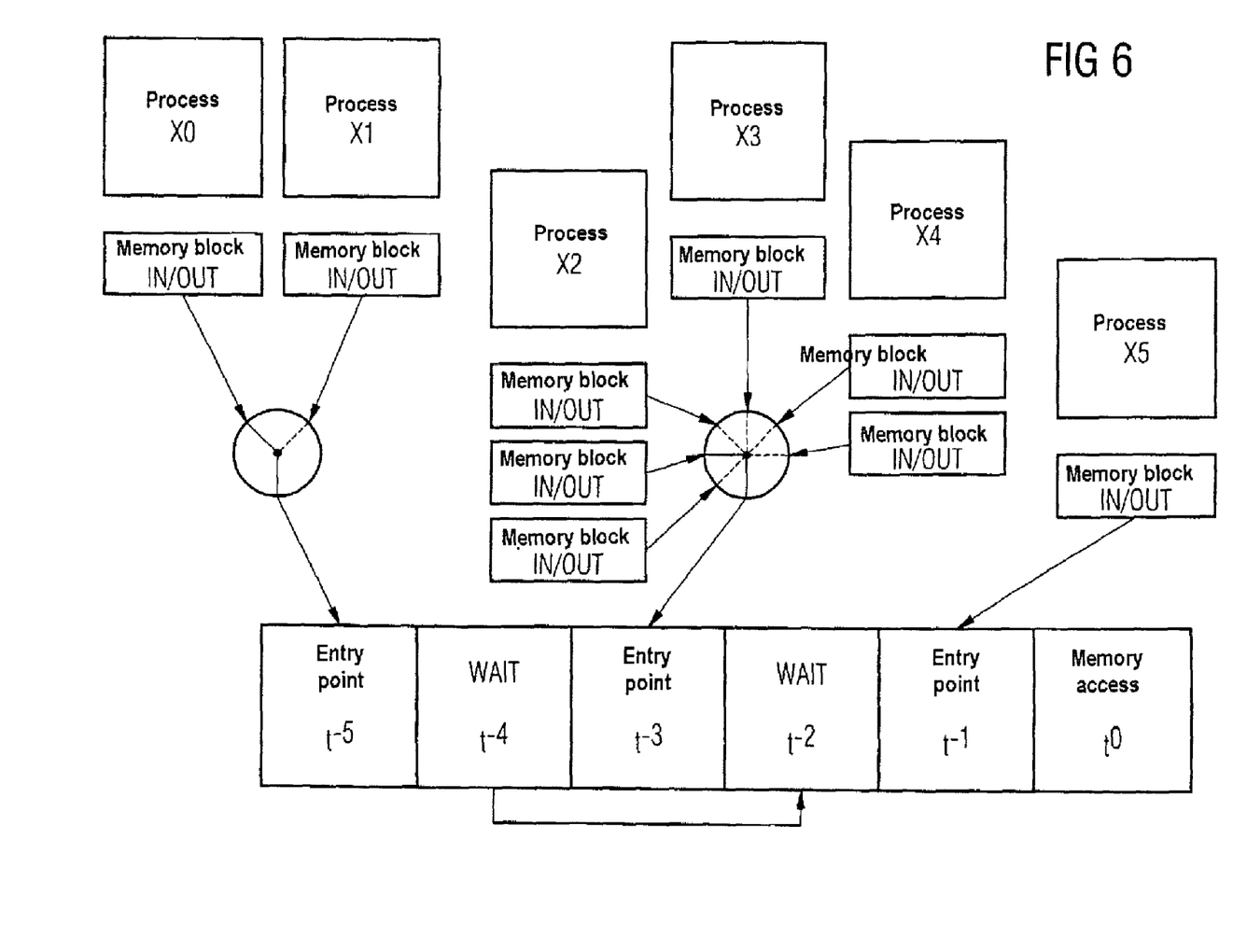
FIG. 6 shows, schematically, the process control in a data packet router according to one aspect of the invention.

FIG. 6 shows, schematically, process control for a plurality of processes X0 to X5 in a data packet router (16 from FIG. 2). The individual access operations to the different parts of the data packet router 16 need to be controlled. In this case, a plurality of processes can access the resources simultaneously, for example a plurality of processes need to be able to write to and read the memory (20 from FIG. 2). No blockages, collisions or conflicts must arise in this context. Collisions can be avoided, by way of example, by using buffers and/or a pipeline. These are situated within the chip in order to avoid unnecessary traffic on the memory 20. To achieve optimum performance, read access should always be effected in burst form. Only the required volume of data may be written. Alternatively, buffers and internal structures can be designed such that a burst on the memory 20 is possible in this case.

Depending on the volume of data, the individual processes X0–X5 are allocated one memory block or a plurality of memory blocks. The size of the memory blocks is not variable. The size corresponds to that of a burst on the external memory 20. Additional priority is achieved by the pipeline and the entry point. The WAIT cycles ($T^{-2}$, $T^{-4}$) thus need to be designed such that all the processes X0 to X5 are dealt with. WAIT cycles are inserted only if an event is queued at the next entry point. The processes X0 and X1 have very low priority. The process X5 has the highest priority, but a small volume of data. The overview in FIG. 6 provides no weighting for the priority distribution of the individual modules within the data packet router 16.

Figure 7:
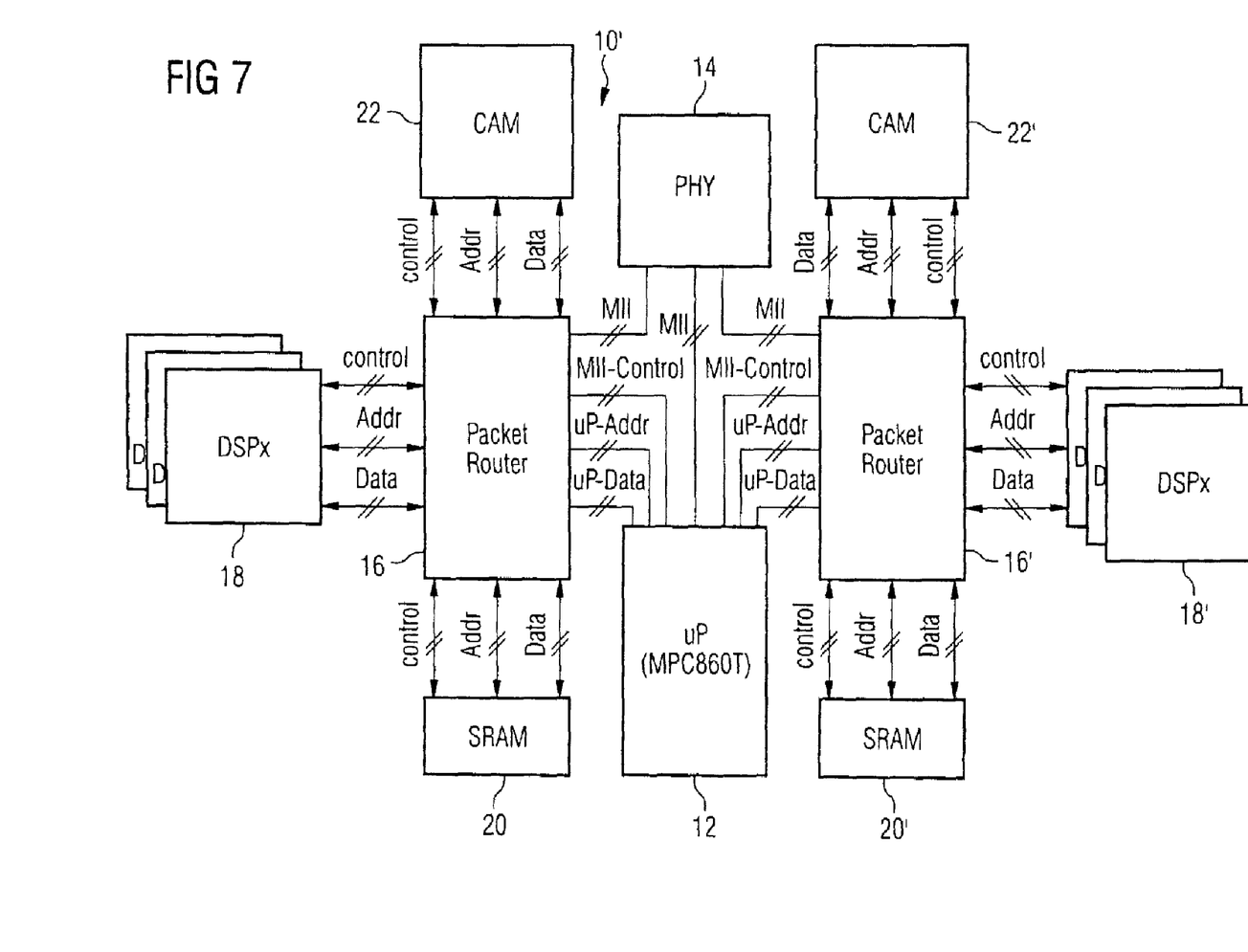
FIG. 7 shows, schematically, a second embodiment of a gateway according to the invention.

FIG. 7 shows a second embodiment of an arrangement having two data packet routers 16, 16'. It differs from the first embodiment described in FIG. 2 by virtue of an additional data packet router 16', which is likewise (like the data packet router 16) connected both to the interface device 14 and to the host processor 12. The data packet router 16' has a separate address memory 22' to which it is connected. In addition, the data packet router 16' is connected to a memory 20' used for temporarily storing data packets. A bank of further subsystems or DSPs 18' is likewise connected to the data packet router 16'.

As already described in FIG. 2, the address memory 22 is managed by the host processor 12. The address memory 22' is likewise managed by the host processor 12. In the arrangement from FIG. 7, the host processor 12 can manage two different address lists—one in the address memory 22, the second in the address memory 22'. Hence, data packets with different addresses can be forwarded to different subsystems 18 and 18'. It would be conceivable for the data packet router 16 to forward data packets containing video information to subsystems 18 processing video data further. On the other hand, the data packet router 16' can forward data packets containing voice information, for example, to corresponding subsystems 18' processing voice data packets further.

In the arrangement 10' shown, the two data packet routers 16 and 16' are arranged in parallel with one another. The advantage is that the two data packet routers 16, 16' can each filter the data packets whose address is stored in the respective address memory 22 or 22' out of the data stream without a time delay. However, the host processor 12 in this arrangement 10' receives all the data packets, since it receives the data packets filtered out by the data packet router 16 from the data packet router 16'. Likewise, it receives the data packets filtered out by the data packet router 16' from the data packet router 16. The advantage of this arrangement 10' is merely the fact that the subsystems 18 and 18' receive the data packets intended for them with just a short time delay. The increase in performance in the microprocessor or host processor 12 is diminished, however, by the fact that it now needs to filter out from all the data packets it receives those data packets which it needs to process further and those data packets which it can discard.

An arrangement is therefore possible (not shown) in which a plurality of data packet routers are arranged in series. In that case, the first data packet router, arranged downstream of the interface device, filters out data packets on the basis of its address list stored in its address memory. It forwards all the data packets which have not been filtered out to the second data packet router. This router in turn now filters, for its part, out of the data stream all those data packets whose address matches an address list stored in its address memory. The advantage of a gateway with data packet routers arranged in series is again a significant increase for the host processor 12, since it receives only the data packets which are intended for it and have not been filtered out previously. A drawback is that the filtering in the second data packet router takes place with a time delay. This time delay becomes even longer with further data packet routers arranged in series.

The embodiment of the invention is not limited to these examples and to the aspects highlighted above, but rather is likewise possible in a multiplicity of modifications within the scope of the claims, said modifications being within the scope of expert action.

No time delay will arise in the arrangements described above. Incoming packets are not temporarily stored in practice, but rather are transparent through to the host processor. The host processor always receives signaling regarding whether or not it may use the current packet (in the latter case: REJECT signal). A parallel arrangement is not necessary and results in problems in the transmission direction (host processor sending packets). The delay time with cascading is only marginal (as a result of gate delay times in the signal amplifiers).

The invention has been described in detail with particular reference to preferred embodiments thereof and examples, but it will be understood that variations and modifications can be effected within the spirit and scope of the invention.

What is claimed is:

1. A method for controlling data packets in a gateway, comprising:
   operating the gateway with a host processor;
   forwarding selected data packets from a data stream to subsystems for further processing, the data packets being forwarded by a data packet router, the data packets being forwarded to the subsystems while bypassing the host processor; and introducing data packets coming from the subsystems directly into the data stream while by passing the host processor, the data packets being introduced by the router, wherein the data packets forwarded to and introduced from the subsystems are Real Time Transport Protocol data packets, the Real Time Transport Protocol data packets are filtered out of the data stream, and the subsystems are a bank of digital signal processors.

2. The method as claimed in claim 1, wherein the method further comprises:

comparing addresses of the data packets with addresses stored in an address memory;

directing a data packet to the host processor if the address of the data packet does not match one of the addresses stored in the address memory; and forwarding a data packet to the subsystems if the address of the data packet matches one of the addresses stored in the address memory.

3. The method as claimed in claim 1, wherein
the subsystems are digital signal processors, and
the method further comprises:

coding data packets for transmission by the digital signal processors to transform the data packets into Real Time Transport Protocol data packets; and introducing the Real Time Transport Protocol data packets into the network's data stream.

4. The method as claimed in claim 2, wherein
the subsystems are digital signal processors, and
the method further comprises:

coding data packets for transmission by the digital signal processors to transform the data packets into Real Time Transport Protocol data packets; and introducing the Real Time Transport Protocol data packets into the network's data stream.

5. A gateway comprising:

an interface device to interchange data packets between the gateway and a data stream in a network;

a host processor;

a memory to temporarily store data packets;

at least one subsystem to process data packets;

an address memory to store addresses of particular connections; and a data packet router to forward selected data packets between the interface and the at least one subsystem using addresses stored in the address memory, the selected data packets being forwarded between the at least one subsystem and the interface so as to bypass the host processor wherein addresses of the data packets are compared with addresses stored in the address memory, data packets are directed to the host processor if the respective addresses of the data packets do not match any of the addresses stored in the address memory; and data packets are forwarded to the subsystems if the respective addresses the data packets match any of the addresses stored in the address memory.

6. The gateway as claimed in claim 5, wherein the network is a local area network based on the Ethernet protocol.

7. The gateway as claimed in claim 5, wherein
the at least one subsystem is a bank of digital signal processors, the selected packets are Real Time Transport Protocol packets, and the data packet router forwards the Real Time Transport Protocol packets directly to the bank of digital signal processors for further processing.

8. The gateway as claimed in claim 5, wherein
there are a plurality of subsystems, and
the gateway has at least one further data packet router which forwards different types of selected data packets to different subsystems to process the selected data packets further.

9. The gateway as claimed in claim 7 wherein
the at least one subsystem is a bank of digital signal processors, the selected packets are Real Time Transport Protocol packets, and the data packet router forwards the Real Time Transport Protocol packets directly to the bank of digital signal processors for further processing.

10. The gateway as claimed in claim 9, wherein
there are a plurality of subsystems, and
the gateway has at least one further data packet router which forwards different types of selected data packets to different subsystems to process the selected data packets further.

11. A method for controlling data packets in a gateway, comprising:

operating the gateway with a host processor;

forwarding selected data packets from a data stream to subsystems for further processing, the data packets being forwarded by a data packet router, the data packets being forwarded to the subsystems while bypassing the host processor;

introducing data packets coming from the subsystems directly into the data stream while by passing the host processor, the data packets being introduced by the router;

comparing addresses of the data packets with addresses stored in an address memory;

directing a data packet to the host processor if the address of the data packet does not match one of the addresses stored in the address memory; and forwarding a data packet to the subsystems if the address of the data packet matches one of the addresses stored in the address memory.

12. A gateway comprising:

an interface device to interchange data packets between the gateway and a data stream in a network;

a host processor;

a memory to temporarily store data packets;

at least one subsystem to process data packets;

an address memory to store addresses of particular connections; and a data packet router to forward selected data packets between the interface and the at least one subsystem using addresses stored in the address memory, the selected data packets being forwarded between the at least one subsystem and the interface so as to bypass the host processor; wherein the at least one subsystem is a bank of digital signal processors, the selected packets are Real Time Transport Protocol packets, and the data packet router forwards the Real Time Transport Protocol packets directly to the bank of digital signal processors for further processing.

* * * * *